(12) United States Patent
Taskar et al.

(10) Patent No.: US 6,885,004 B2
(45) Date of Patent: Apr. 26, 2005

(54) HIGH RESOLUTION TILED MICROCHANNEL STORAGE PHOSPHOR BASED RADIATION SENSOR

(75) Inventors: Nikhil R. Taskar, New York, NY (US); Rameshwar Nath Shargava, Briarcliff Manor, NY (US)

(73) Assignee: Nanocrystal Imaging Corporation, Briarcliff Manor, NY (US)

( * ) Notice: Subject to any disclaimer, the term of this patent is extended or adjusted under 35 U.S.C. 154(b) by 136 days.

(21) Appl. No.: 10/073,702

(22) Filed: Feb. 11, 2002

(65) Prior Publication Data

US 2002/0074929 A1 Jun. 20, 2002

Related U.S. Application Data

(63) Continuation-in-part of application No. 09/688,662, filed on Oct. 16, 2000, now Pat. No. 6,534,772, which is a continuation-in-part of application No. 09/385,995, filed on Aug. 30, 1999, now Pat. No. 6,452,184, which is a continuation-in-part of application No. 09/197,248, filed on Nov. 20, 1998, now Pat. No. 6,300,640, which is a continuation-in-part of application No. 08/980,416, filed on Nov. 28, 1997, now Pat. No. 5,952,665.
(60) Provisional application No. 60/268,137, filed on Feb. 12, 2001.

(51) Int. Cl.$^7$ ................................................ G01T 1/20
(52) U.S. Cl. .................. 250/367; 250/483.1; 250/486.1
(58) Field of Search .............................. 250/367, 483.1, 250/486.1

(56) References Cited

U.S. PATENT DOCUMENTS

| 5,493,169 | A | * | 2/1996 | Pierle et al. | .......... 313/103 CM |
| 5,952,665 | A | * | 9/1999 | Bhargava | .................. 250/483.1 |
| 6,045,722 | A | * | 4/2000 | Leblans et al. | ...... 252/301.4 H |
| 6,300,640 | B1 | * | 10/2001 | Bhargava et al. | ......... 250/483.1 |
| 6,452,184 | B1 | * | 9/2002 | Taskar et al. | ................ 250/367 |
| 6,534,722 | B1 | * | 3/2003 | Takaoka | ..................... 174/254 |
| 6,541,773 | B1 | * | 4/2003 | Iwabuchi et al. | ...... 250/370.11 |

* cited by examiner

Primary Examiner—David Porta
Assistant Examiner—Christine Sung
(74) Attorney, Agent, or Firm—William L. Botjer

(57) ABSTRACT

X-ray imaging screens utilizing phosphors disposed in microchannels disposed in a plate. This application relates to the "tiling" of such microchannel plates to form a larger imaging area and to the use of "storage phosphors" in the microchannel plates which enables the phosphors to be read out after exposure and from the side exposed to the X-rays. The storage phosphor screens of the present invention provide significantly increased resolution than the prior art storage phosphor screens.

16 Claims, 8 Drawing Sheets

CONVENTIONAL SCREEN

HIGH RESOLUTION TILED MICROCHANNEL STORAGE PHOSPHOR BASED RADIATION SENSOR

CLAIM FOR PRIORITY

This application claims the priority of U.S. Provisional patent application Ser. No. 60/268,137 filed Feb. 12, 2001, entitled "High Resolution Tiled Microchannel Storage Phosphor Based Radiation Sensor"

REFERENCE TO RELATED APPLICATIONS

This application is a continuation in part of U.S. patent application Ser. No. 09/688,662 filed Oct. 16, 2000 now U.S. Pat. No. 6,534,772 Entitled "High Resolution High Output Microchannel Based Radiation Sensor" which is a continuation in part of U.S. patent application Ser. No. 09/385,995 filed Aug. 30, 1999 now U.S. Pat. No. 6,452,184 Entitled "Microchannel High Resolution X-ray Sensor Having an Integrated Photomultiplier" which is a continuation in part of U.S. patent application Ser. No. 09/197,248 filed Nov. 20, 1998 now U.S. Pat. No. 6,300,640 Entitled "Composite Nanophosphor Screen For Detecting Radiation Having Optically Reflective Coatings" which in turn is a continuation in part of Ser. No. 08/980,416 filed Nov. 28, 1997 U.S. Pat. No. 5,952,665 issued Sep. 14, 1999 Entitled "Composite Nanophosphor Screen for Detecting Radiation".

BACKGROUND AND SUMMARY OF THE INVENTION

The present invention relates to X-ray imaging screens utilizing phosphors disposed in microchannels disposed in a plate. More specifically this application relates to the "tiling" of such microchannel plates to form a larger imaging area and to the use of "storage phosphors" in the microchannel plates which enables the phosphors to be read out after exposure and from the side exposed to the X-rays. The storage phosphor screens of the present invention provide significantly increased resolution than the prior art storage phosphor screens.

Fine detail visualization, high-resolution high-contrast images are required for many X-ray medical imaging systems and particularly in mammography. The resolution of X-ray film/screen and digital mammography systems is currently limited to 20 line pairs/mm and 10 line pairs/mm, respectively. In particular, light scattering by the phosphor particles and their grain boundaries results in loss of spatial resolution and contrast in the image. In order to increase the resolution and contrast, scattering of the visible light must be decreased. The present invention is directed to a novel microchannel composite screen design, which provides high resolution, high contrast, and efficient X-ray to visible light conversion screens for X-ray imaging. The microchannel phosphor screen can be used in both electronic (digital) and film (analog) X-ray imaging.

A conventional X-ray screen, as shown in FIG. 1 herein has a thickness of about 30–300 microns ($\mu m$) and consists of phosphor particles with a mean size between a few to 10 microns. The light generated in the screen by the incident X-ray diffuses towards the film emulsion over the finite thickness of the screen material. As the light diffuses, it spreads out which results in a loss of spatial resolution and contrast in the image. To improve resolution and contrast, thinner screens could be employed. However, use of the standard larger-particle phosphors in thin screens results in grainy images, poor resolution and low X-ray absorption. It is therefore necessary to significantly reduce the phosphor particle size and/or reduce light scattering to improve image resolution.

It has been determined that the highest resolution and lowest light scattering could be achieved only if the phosphors are disposed in microchannels. When microchannel substrates are filled with phosphors, a new class of high resolution microchannel phosphor screens become available for various medical imaging applications. By proper selection of the phosphors and substrate materials, the X-ray generated light propagates in a waveguide mode by means of internal reflection, thereby significantly reducing scattering. Thus, the microchannel screen of the present invention can dramatically enhance contrast and resolution and ensure more accurate detection and better diagnostic imaging capabilities Our previous work in the design and construction of microchannel based X-ray screens can be found in U.S. Pat. No. 5,952,665; issued Sep. 14, 1999 Entitled Composite Nanophosphor Screen for Detecting Radiation"; U.S. patent application Ser. No. 09/688,662 filed Oct. 16, 2000 Entitled "High Resolution High Output Microchannel Based Radiation Sensor"; U.S. patent application Ser. No. 09/385,995 filed Aug. 30, 1999 Entitled "Microchannel High Resolution X-ray Sensor Having an Integrated Photomultiplier", U.S. patent application Ser. No. 09/197,248 filed Nov. 20, 1998 Entitled "Composite Nanophosphor Screen For Detecting Radiation Having Optically Reflective Coatings", U.S. patent application Ser. No. 09/688,662 filed Oct. 16, 2000 Entitled "High Resolution High Output Microchannel Based Radiation Sensor and PCT published application No. WO 99/28764. The disclosures of these previous US patent applications and issued patent are hereby incorporated by reference as if fully set forth herein.

Many processes for producing microchannel imaging plates are limited by the largest dimension of the plate that can be readily produced. Many otherwise suitable processes produce plates that have a maximum dimension of 2 to 4 inches. However, many X-ray imaging applications require plates of larger sizes. Larger size plates can be manufactured by combining a number of smaller plates by "tiling" or forming a mosaic of smaller plates. However, simply arranging smaller plates on a base substrate can make it very difficult to repair a damaged imaging screen even if only a small portion of the overall plate is damaged. The present invention provides an improved construction for imaging screens formed from a plurality of tiled microchannel plates.

Recently a new type of phosphor has been utilized in X-ray imaging screens, this phosphor is known as a "storage phosphor" or "photostimulable storage phosphor". Screens comprised of storage phosphors may used in place of standard scintillator or film plates in X-ray imaging systems. After exposure to X-rays the storage phosphors will retain the X-ray image for a significant period of time so that the image can be read out at a remote location long after the image has been "exposed". The image is read out by thermal or optical stimulation such as by scanning with a laser. After readout of the stored image, the imaging screen is then "reset" for subsequent reuse. These storage phosphor screens are very suitable for computerized radiography applications. However, previous storage phosphor imaging screens have not provided high resolution. The present application provides radiation imaging plates using storage phosphors of significantly increased resolution.

A storage phosphor imaging screen does not have to be read out in "real time", thus such screens are particularly suitable for reading out from the side that is exposed to the X-ray rather than the other side. When a microchannel plate is read out from the same side that is exposed to X-ray (the "front" side), rather than from the opposite ("back") side, a number of the design parameters of the microchannel plate are eased. The plate can be thicker, and thus easier to handle as only the phosphors in the upper portion of the plate are read out to form the image. In plates that are read from the back, overly thick plates means relatively long microchannels, which because of the many internal reflections of the light, can adversely affect light output with backside readout. The fact that only the phosphors in the upper portion of the microchannels are read also means the microchannel need not be filled all the way down and that the lower potion of the plate can be filled with non light emitting material. Furthermore, in a front read microchannel plate, the microchannels need also not be uniformly plated with a highly reflective coating all the way down the microchannels. The present application provides radiation imaging plates using storage phosphors disposed in microchannel plates that provide significantly increased resolution and are suitable for reading out from the front side.

BRIEF DESCRIPTION OF THE DRAWINGS

For a better understanding of the invention, reference is made to the following drawings which are to be taken in conjunction with the detailed description to follow in which.

DESCRIPTION OF THE PREFERRED EMBODIMENTS

Basic Construction

Figure 1:
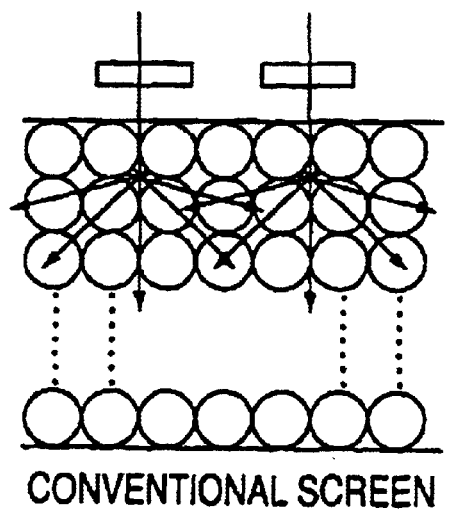
FIG. 1 is a sectional view of a conventional X-ray screen.
Figure 2:
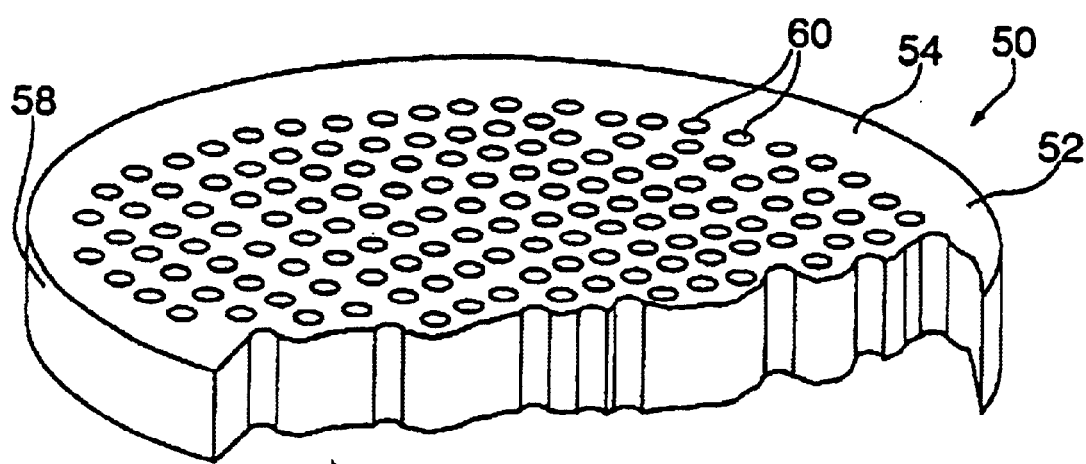
FIG. 2 is a cut away perspective view of a microchannel phosphor screen constructed in accordance with an embodiment of the present invention, note that the microchannels are not drawn to scale.

FIG. 2 illustrates a microchannel phosphor screen 50 for converting radiation impinging thereon to visible light which has use, for example in an X-ray imaging system. Microchannel phosphor screen 50 comprises a substrate 52 which has an upper planar surface 54, a lower planar surface 56 and a cylindrical edge 58. Extending from upper surface 54 to lower surface 56 of substrate 52 are a multiplicity of small channels ("microchannels") 60 which have a diameter on the order of about 0.5–40$\mu$ (microns) and more usually 5–20$\mu$. Microchannels 60 are spaced apart approximately 1 to 12 microns, and the plate has a thickness on the order of 50–2000 microns (which is also the length of the microchannels). The material used as the substrate can be glass, silicon (crystalline, alpha, amorphous, or polysilicon as used in the fabrication of integrated circuits) as well as metals such as aluminum as techniques for the micro formation of microchannels exist for all of these materials. Furthermore, substrate 52 need not be circular in plan view, as it can be of any configuration and larger sizes can be made from a number of substrates "tiled" together. As is discussed in detail below, optimization of the microchannel's and phosphor's construction, dimensions and the relationship between the microchannels and the phosphors, will greatly increase the amount of light emitted by the microchannel plates. The resolution of the plate can be controlled by the microchannel diameter, although other components in the system may reduce the microchannel plates practical resolution. For example a plate with 5 micron diameter microchannels with a 1–2 micron wall thickness has a theoretical resolution of about 88 lp/mm; a 10 micron microchannel plate has a theoretical resolution of about 44 lp/mm; a 20 micron microchannel plate has a theoretical resolution of about 22 lp/mm; and a 40 micron microchannel plate has a theoretical resolution of about 11 lp/mm.

Figure 3:
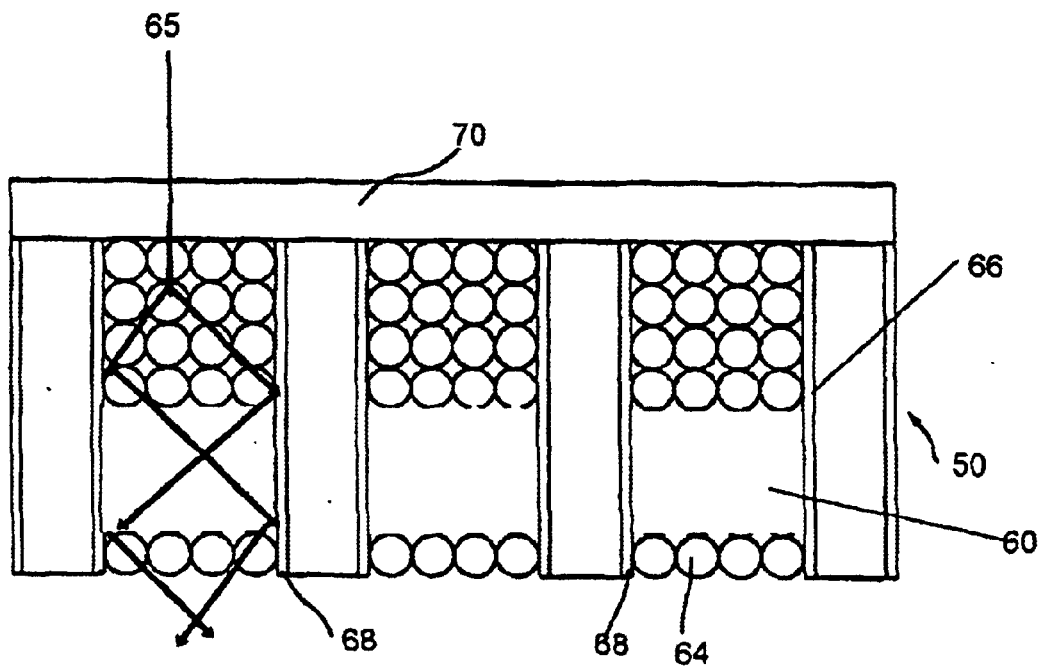
FIG. 3 is a sectional view of the radiation and light path of the action of the phosphors as disposed in the microchannels of the phosphor screen an embodiment of the present invention.

As shown in FIG. 3, deposited within microchannels 60 are commercially available phosphors 64 having diameters of from about 0.1 to 40 microns (referred to as "micron sized phosphors"). An X-ray 65 entering the upper portion of microchannels 60 will impinge on phosphors 64 be absorbed by phosphors 64 and cause the emission of light which will be reflected by a reflective coating 68 located on the microchannel walls 66. Particularly suitable materials for the reflective coating 68 are metals such as gold, silver, platinum, palladium, nickel and aluminum. The use of reflective wall coatings permits the use of screen materials which do not have a refractive index suitable to optically guide light emitted by the phosphors down the microchannels, or which are not reflective. The use of reflective coatings along the microchannel walls will eliminate optical "cross-talk" between adjacent microchannels. The coatings can be applied to the walls of the microchannels by any suitable means such as electroless (chemical) plating, electroplating and/or integrated circuit deposition techniques.

In addition to the coating applied to the walls of microchannels 60 a second coating 70 can be applied atop the microchannel phosphor screen. Preferably, coating 70 is X-ray transparent but optically reflective, as such X-ray will pass through coating 70 causing the phosphors to emit light in a number of directions but any light emitted upwardly will be reflected by top coating 70 down the microchannels, thus increasing light output. As the microchannel's diameters and length can be adjusted without undue light scattering, the present microchannel phosphor screens can be used to detect other than X-ray radiation, such as gamma rays which require thick screens. Multiple substrates containing phosphors in microchannels may be "stacked", if necessary to provide the required thickness.

The present invention can be used with a variety of commercially available phosphors comprising host materials such as Y2O3, Y2O2S, Gd2O3, Gd2O2S, CsI and PbO. Each of these may be doped with europium which will cause the phosphor to emit red light, terbium which will emit green and thulium which will emit blue. Other suitable host materials are zinc sulfide (ZnS) and zinc oxide (ZnO) cadmium oxide (CdO) and cadmium sulfide (CdS) which can be doped with manganese (Mn) as well as transition and rare earth metals. The fact that the phosphors are disposed in discrete locations, i.e. the individual microchannels, means that different dopants can be disposed in different areas of the substrate to generate different colors of light. Thus RGB phosphor screens can be constructed with the present invention. Furthermore, in addition to different dopants, different host materials can be disposed in varying locations on the substrate as well, and these different materials can be excited so as to have different light emissions to dissimilar X-ray energies to provide a color keyed display of X-ray energy distribution. Different phosphors may be deposited in only certain of the microchannels by masking off some areas of the substrate, depositing phosphors in the unmasked microchannels and thereafter masking off the already deposited areas followed by deposition of the dissimilar hosts and dopants. Furthermore, substrates having differing types of phosphors and or filtering/attenuating coatings may be stacked atop each other such that the red emitting phosphors are in one substrate, the green in a second and the blue in a third. The phosphors may be deposited in the microchannels by means of, for example, controlled osmotic, settling and vacuum processes.

Light Output Optimization

According to an embodiment of the present invention phosphor filled microchannel plates for radiation detection use a geometry and construction optimized for the particular type of use to which the plate is to be put. Without a systematic approach and an optimization of the microchannel's and phosphor's construction, dimensions and the relationship between the microchannels and the phosphors, the plates do not emit any useful amount of light. If the plate design and construction is not optimized, the visible light output will be severely compromised. Without proper design, almost all (approx. 99%) of the visible light generated by the phosphors can be lost in the microchannels, thus rendering the plates essentially useless even though the phosphors efficiently converted the absorbed X-ray energy to visible light.

a) Smoothness of microchannels

The process used to produce the microchannel plate should provide microchannels having smooth cylindrical interior walls with all surfaces parallel to the microchannels so that they will reflect light down the microchannels towards the light sensor and not in other directions. As used herein "smooth" means compared with the wavelength of light in question, green light, such as that emitted by most commercially available phosphors, has a wavelength of 0.55 microns. Put another way the walls of the microchannel should have a "high surface finish". The average size of the irregularities in the microchannel wall should be less than about 0.05 microns (i.e. less than approximately one tenth of the wavelength of the light to be reflected). Smooth walls also permit a highly reflective coating to be applied to the walls of the microchannels, as is discussed in detail below, the ability to deposit a coating having a reflectivity of greater than 90% is important to achieving optimized light output and a high signal to noise ratio. Many etching processes used to produce microchannel plates do not provide the walls of the microchannels with a sufficiently smooth surface to avoid scattering of light at random angles. Furthermore, scintillation plates the use processes such as etching or laser ablation of the scintillation material, even with the use of reflective coatings, have walls that are unacceptably rough because the individual phosphor particles and/or binders cannot be sheared or ablated so as to form smooth walls.

A preferred process for producing plates meeting these parameters utilizes the formation of the microchannels by means of relatively soft glass cylindrical fibers embedded perpendicularly in a harder glass substrate, so that when the soft glass is chemically dissolved, smooth cylindrical microchannels are provided in the plate. The size of the microchannels of these plates is controlled by the diameter of the fibers and this process provides relatively thin wall thicknesses (2 microns) which provides a large microchannel area as compared to the total plate area (i.e. the "open area ratio" is maximized). The surface irregularities of the microchannel walls in these plates are generally smaller than 0.05 microns. These "glass fiber" process plates are readily commercially available. Other materials, such as silicon, if capable of providing sufficiently smooth, uniform and densely packed microchannels may also be used for the plates.

b) High reflectivity coating

A highly reflective coating applied to the walls of the microchannels when coupled with a decease in the number of scattering surfaces will greatly increase the light output. However, the application of a reflective coating to high aspect ratio microchannels has previously been found to be difficult. The coating to be applied should be: 1) homogeneous, that is it must have equal thickness throughout the length of the microchannel; 2) thin (e.g. 0.05 microns or less) so that it does not block or unduly decrease the diameter of the microchannel and to permit multiple coatings to be applied to increase the reflectivity; 3) highly reflective to decrease diffusion scattering and to provide mirror like reflectivity; and 4) smooth to avoid random reflections. Furthermore, the process used to apply the coating must not harm the substrate or leave any byproducts in the microchannels.

A seemingly small increase in the reflectivity in the coating may cause a great increase in light output because the light emitted by the phosphors will reflect off the coating a number of times as it travels down the microchannels. By way of example let us assume that light is reflected eight times on its way down the channel. If the reflectivity of the channel is 80% (usually considered to be good reflectivity) the light input to the microchannel will be reduced by a factor of 0.8, 8 times or 0.8 raised to the eighth power (0.88) which is 0.17 or 17%. Thus 83% of the light is lost with a 80% reflectivity coating. If, on the other hand, a reflectivity of 93% were achieved which is close to the practical maximum of 94%, with eight reflections the light output will be 0.938=0.56 or 56% which is 3.3 times as much light output (0.56/0.17) with a 93% reflective coating as compared to a 80% reflective coating. Thus, high reflectivity in the light reflective coating is an important factor in improving light output. Accordingly, for optimum light output the reflective coating applied to the walls should have a reflectivity of at least 85% and preferably greater than 90%.

In U.S. patent application Ser. No. 09/628,570, entitled "Process for Providing a Highly Reflective Coating to the Interior Walls of Microchannels", Filed Jul. 31, 2000; which is assigned to the assignee of the present application, there is disclosed a process for providing a highly reflective coating to the walls of microchannels. The process of this patent provides a smooth, uniform and thin (e.g. 0.02–0.05 micron) coating of metallic silver to the walls of the microchannels. This coating process will achieve reflectivities of greater than 90% and up to 93%. The coating applied by this process has been found to be tough in that it remained intact even when heated to 400° C. in an inert atmosphere. This means that the plate may be further processed without adversely affecting the reflectivity of the coating. The disclosure of this U.S. patent application is hereby incorporated by reference as if fully set forth herein.

c) Optimizing diameters of phosphors with respect to the microchannel diameter

Efficiency of light output is also increased when the diameter of the phosphors is correlated to the diameter of the microchannels, such that the diameters of the phosphors fall within a specified range of percentages of the diameter of the microchannels. If the size of the phosphors is too large relative to the diameter of the microchannels the generally irregularly shaped phosphors may become lodged together during the filling of the microchannels which results in a blocking of the microchannel which prevents complete filling of that microchannel. If on the other hand the phosphors are too small, the smaller phosphors (called "fines") create thousands of scattering surfaces which reduces the light output of the microchannel.

A suitable range of phosphor diameters as compared to microchannel diameter is that the phosphors should have diameters of from about 25 to 80% of the diameter of the microchannels and preferably 40–75% of the diameter of the microchannels. These microchannel diameter ranges can be accomplished by, for example sieving or settling the phosphors, prior to filling the microchannels, so that both the larger and smaller phosphors are removed before the microchannels are filled.

d) Correlating plate and microchannel dimensions with X-ray energy

The dimensions of the microchannels diameter and length (which is the plate thickness) can be optimized for the particular X-ray energy that is to be utilized so that light output is maximized. The amount of phosphors disposed in each microchannel should be correlated so that about 85–90% of the impinging X-rays are absorbed (which is close to the practical maximum of X-ray absorption as absorption trails off exponentially). However, there should not be more phosphors than required to absorb 85–90% of the X-ray as additional phosphors will form additional scattering surfaces which will reduce light output without contributing any additional light generation.

One way to control phosphor volume (and thus X-ray absorption) is to control microchannel volume by adjusting the length of the microchannel (plate thickness) and microchannel diameter. Generally as X-ray energy is increased the length and diameter of the channels should be increased so that 85–90% x-ray absorption is achieved. By way of example, for X-ray energies of 20–25 Kev (typical for mammography applications) with a microchannel diameter of 10 microns, the plate thickness should be about 60–100 microns. Merely increasing channel length to increase phosphor volume, is not preferred as a overly long microchannel will cause light loss due to additional reflections in the microchannel. Thus both the microchannel length and diameter should be increased. Although increased microchannel diameter will decrease theoretical resolution, there is usually enough leeway as the rest of the system (light detector and electronics) generally do not have a high a resolution as the microchannel plate. While a 10 micron microchannel has a theoretical resolution of 44 lp/mm, if the microchannel diameter is doubled (which quadruples the phosphor volume) a 20 micron microchannel plate still has a resolution of 22 lp/mm.

Another way to control X-ray absorption is to control the packing density of the phosphors within the microchannels, which can be controlled during the phosphor filling process. However, dense packing of phosphors to provide additional x-ray absorption will also contribute additional scattering surfaces. This problem can be avoided by the use of index matching material in the microchannels which will eliminate scattering from these surfaces. The use of index matching is discussed in detail next.

e) Index Matching

The materials used in the phosphors generally have an index of refraction (IR) of approximately 1.6–2.3, while the IR of air is approximately 1.0, which results in a relatively severe refractive index mismatch at the exterior of each phosphor. Such a refractive index mismatch will limit the amount of light emitted by the phosphors, can create undesirable inter channel scattering and less than optimum angles of reflection from the reflective coating, causing less than optimum light emission from the microchannels.

Such inefficiencies can be reduced by providing a refractive index matching material within each microchannel and surrounding phosphors. Suitable refractive index matching materials are various transparent liquids, epoxy, glass, plastics, or thermoplastics. The refractive index matching material must be transparent to the light emitted from the phosphors and have a viscosity low enough so that it will flow into the microchannels and into the interstices between the phosphors. Commercially available clear index matching materials have an IR of approximately 1.4–1.6, which while smaller than that of the phosphors, is greater than that of air, and will provide some degree of index matching and thus reduction of scattering and increased light output.

f) Comparative performance

There are two well known scintillation screens for medical X-ray applications, both produced by Eastman Kodak and referred to as "LanexTM Regular" and "Min RTM". These screens both comprise a layer of scintillation material disposed on a polymer layer. The Lanex regular screen has relatively high light output per unit of X-rays, but a low resolution of only about 5 line pairs per millimeter (lp/mm). The Min R screen is thinner than, and has a light output of only about 50%, of the Lanex regular screen, but a higher resolution of 12–13 lp/mm, although the higher resolution images are generally of lower contrast. The present invention provides microchannel based X-ray screens that have greater than 20 lp/mm and a light output a significant percentage of the Min R screen. As currently developed the microchannel based X-ray detectors using 10 micron microchannels have a theoretical resolution of over 40 lp/mm and a light output of about 25% of the Min R screen (12% of Lanex regular screen). These measured parameters confirm that the combination of microchannel wall smoothness and length control, phosphor particle diameter and density control and overall plate optimization yield a digital X-ray screen having much higher resolution and comparable light output to the Lanex and Min R screens. When compared to other digital systems the present microchannel plates provide 2–5 times the resolution at comparable brightness with further improvements expected.

System Integration

Figure 4:
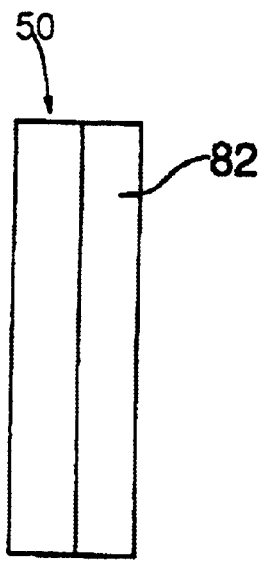
FIG. 4 is a schematic view of the microchannel phosphor screen of the present invention used in conjunction with conventional photographic film.

In traditional X-ray systems, the light detection device is a sheet of photographic film. More recently, electronic light detection devices such as Charged Coupled Devices (CCD) and CMOS silicon devices have been used. The microchannel phosphor screen of the present invention is compatible with both types of light collection systems. FIG. 4 illustrates the phosphor screen 50 of the present system disposed proximate to a standard piece of photographic film 82. X-rays impinging on microchannel phosphor screen 50 will cause the generation of visible light which will be directed down the microchannels towards film 82 which will cause the exposure of the film, which upon subsequent development, will form the X-ray image.

Figure 5:
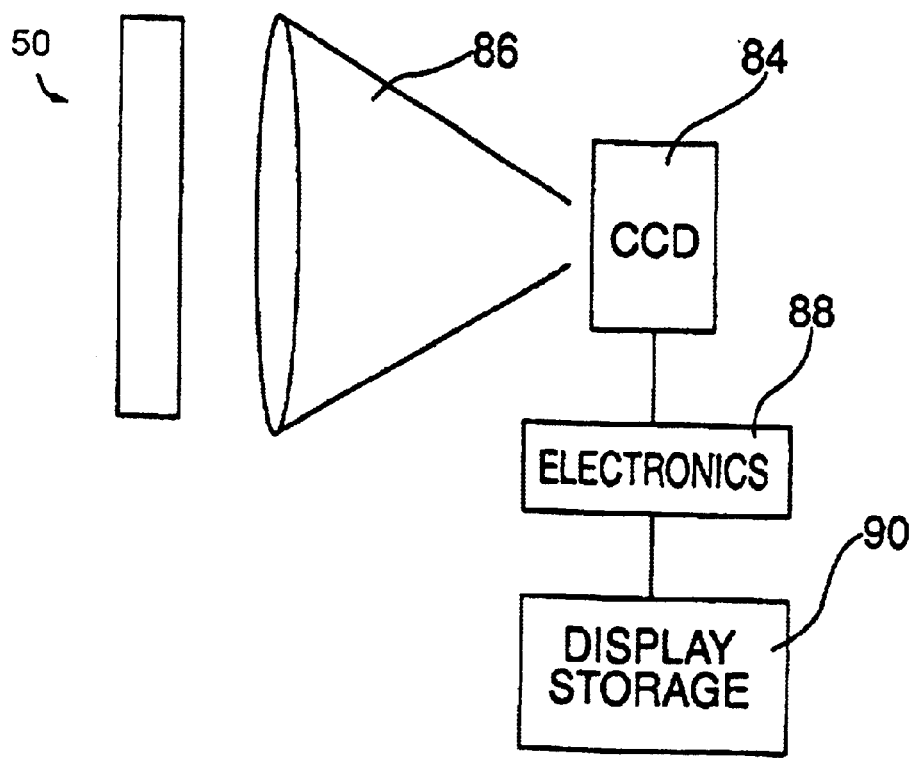
FIG. 5 is a schematic view of the microchannel phosphor screen of an embodiment of the present invention used in conjunction with a CCD/CMOS light detector and suitable collection optics.

FIG. 5 illustrates phosphor screen 10 of the present system used in conjunction with standard sized CCD, CMOS or other type of electronic light detector 84. Disposed between microchannel phosphor screen 50 and detector 84 is a collection lens or fiber optic taper 86 which directs the light emitted by screen 10 to detector 84 which outputs an electronic signal representative of the light impinging thereon to electronics 88 and thereafter to a display and/or storage device 90. Collection lens 86 can be a projection lens similar to those used in projection television systems but used in "reverse".

Figure 6:
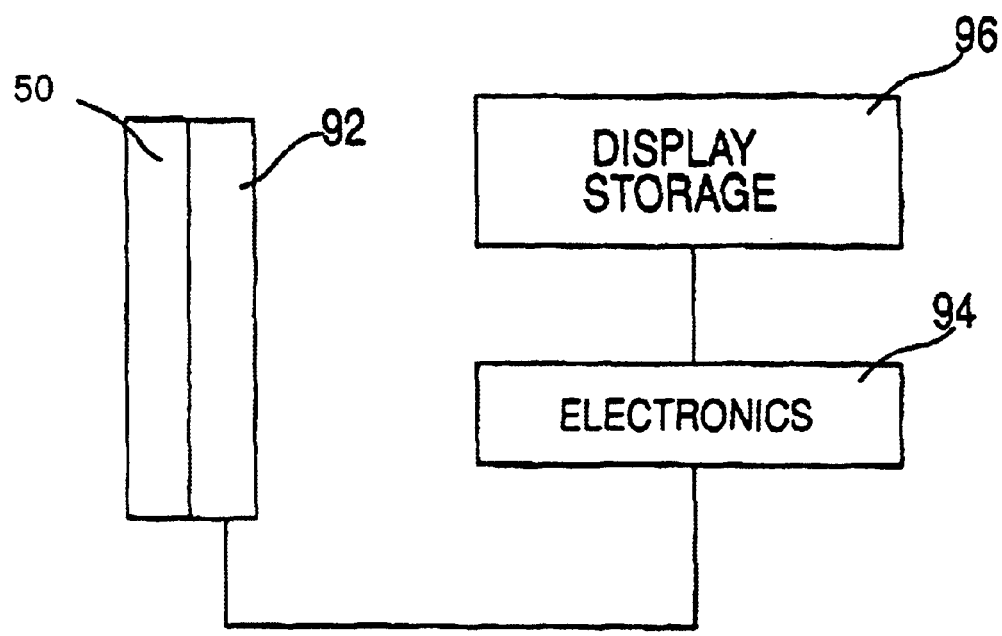
FIG. 6 is a schematic view of the microchannel phosphor screen of an embodiment of the present invention used in conjunction with an electronic light detector which is integrated with the microchannel phosphor screen.

The fact that the microchannel phosphor screens of the present invention can be formed from glass or silicon provides the benefit that the screen and light detection apparatus as well as the display screen can be integrated into a single unit. FIG. 6 illustrates microchannel phosphor screen 50 which is integrated with the light collection device 92 which eliminates the need for light collection optics. Standard semiconductor formation techniques may be used to form light collection device 92 on the rear of microchannel phosphor screen 50. Thereafter, the electrical signals of light collector 92 is applied to electronics 94 and to an electronic display and/or storage device 96. Light collector 92 can be a CCD or an CMOS silicon light sensor which is based on thin film display technology and which is readily available. It is to be noted that in CCD/CMOS detectors the usual pixel size is 5–25 microns. This means that each pixel is acted upon by one to many microchannels, depending upon the size and spacing of the microchannels. Furthermore, since the microchannels are larger than the phosphors there are many phosphors per microchannel. Thus microchannel phosphor screens constructed in accordance with the present invention provide a great redundancy of information, as there are many light generators in each microchannel and many microchannels per pixel. This provides uniform, reliable, sensitive and accurate X-ray detection.

Figure 7:
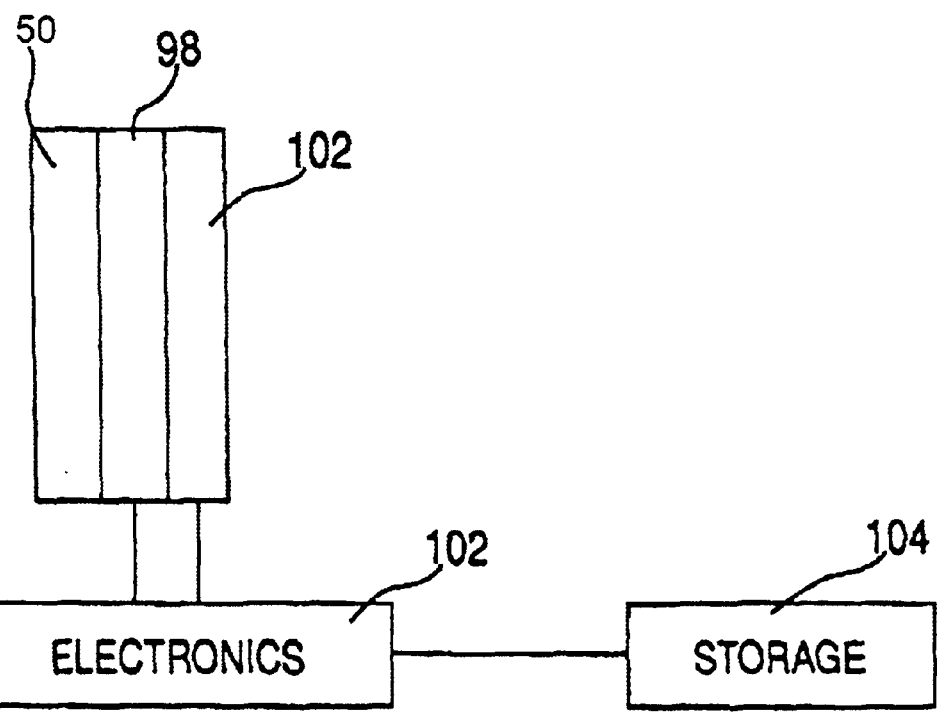
FIG. 7 is a schematic view of the microchannel phosphor screen of an embodiment of the present invention used in conjunction with an electronic light detector and a display which is integrated with the microchannel phosphor screen.

FIG. 7 takes the screen/light detector integration of FIG. 6 a step further in which the microchannel phosphor screen, the light detector and the display device are integrated into a single unit. In FIG. 7, microchannel phosphor screen 50 is integrated with a light detector 98, which can be an amorphous silicon sensor, and a display 100 which can be, by way of example only, a thin film transistor display. Since microchannel phosphor screen 10, detector 98 and display 100 can each be formed from glass or silicon, integration of these units is made feasible, for example, by the use of microchannel phosphor screens of the present invention. Light detector 98 is connected to electronics 102 which is in turn connected to provide the signal to display and optionally to an electronic storage device 104.

Figure 8:
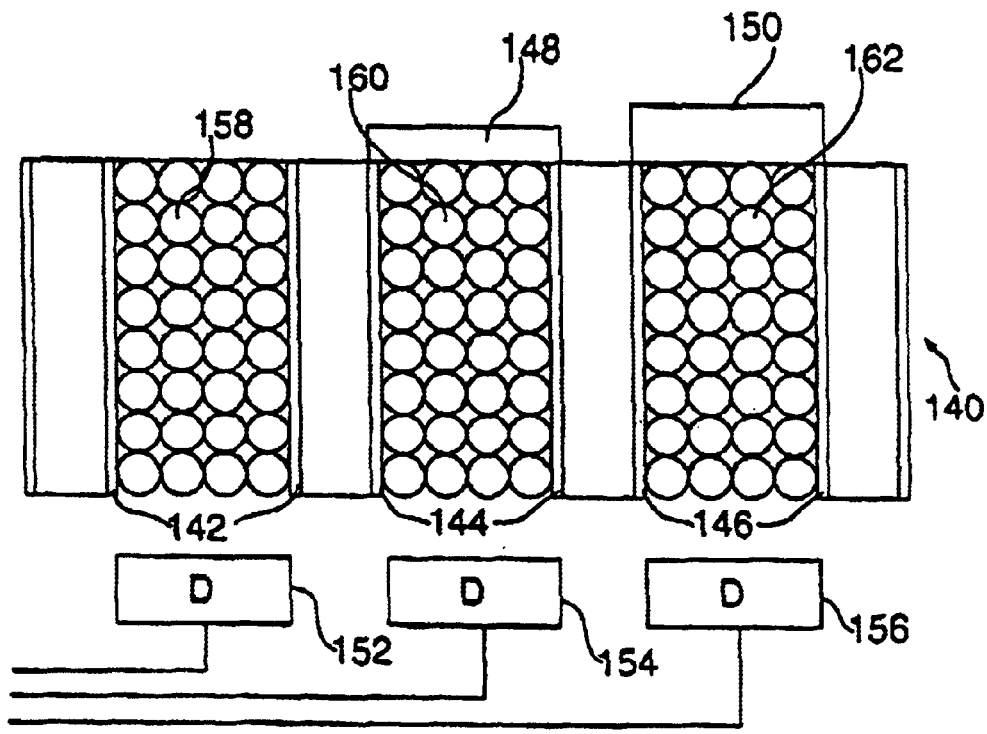
FIG. 8 is a sectional view of an embodiment of the microchannel phosphor screen of the present invention using radiation filtering/attenuating coating of differing attenuation levels.

In addition to optically reflective coatings other types of coatings may be disposed on the substrates, FIG. 8 illustrates a substrate 140 which has radiation attenuating and/or filtering coatings applied thereto. Radiation filtering refers to the properties of certain metals to attenuate only certain X-ray frequencies, while allowing other X-ray frequencies to pass with lesser degrees of attenuation, similar to a colored optical filter. Radiation attenuating coatings are used to prevent radiation of certain energy levels from reaching the phosphors located in certain of the microchannels, this permits different microchannels to be sensitive to different X-ray energies. Substrate 140 includes microchannels 142 which have no radiation attenuating coatings applied thereto, microchannels 144 which have a first level of radiation attenuating coating 148 disposed atop them facing the source of radiation and microchannels 146 which have a second level of radiation coating 150 disposed atop them. Disposed beneath microchannels 142, 144 and 146 are radiation detecting elements 152, 154 and 156 which will detect the light emitted from the phosphors 158, 160 and 162 disposed in microchannels 142, 144 and 146.

In operation, detector 152 under microchannel 142 will be activated by X-ray of any energy level above the minimum threshold of phosphors 158 as microchannel 142 has no X-ray attenuating material disposed above it. Detector 154 under microchannel 144 will be activated by only radiation of energy levels sufficient to penetrate first level radiation attenuating coating 148 disposed above it. Thus, phosphor 160 in microchannel 146 will emit light to detectors 154 only upon exposure to radiation above the threshold set by coating 148. Detector 156 under microchannel 146 will be activated only by radiation of energy levels sufficient to penetrate second level radiation attenuating coating 150 disposed above it. Thus, phosphors 162 in microchannel 146 will emit light to detectors 156 only upon exposure to radiation above the threshold set by second level coating 148. In sum, radiation sufficient to penetrate second coating 150 will activate all detectors 152, 154 and 156; radiation sufficient to penetrate first level coating 148 but insufficient to penetrate second level coating 150 will activate detectors 152 and 154; radiation insufficient to penetrate either first level coating 148 or second level coating 150 will activate only detector 152.

Thus, the radiation attenuating coatings applied to the microchannel phosphor screens of the present invention will permit discrimination of various radiation levels. Suitable radiation attenuating coatings include tungsten(W), tin (Sn), lead (Pb) lead oxide (PbO) and filtering coatings such as aluminum, tin, molybdenum, tungsten and gold. The levels of radiation attenuation of the coatings can be achieved by using different materials and/or different coating thicknesses. The number of different radiation levels that is required is controlled by the needs of the application and the differing thickness and materials used. The use of radiation attenuating coatings is particularly suitable for use with X-rays as it facilitates tissue discrimination .The radiation attenuating coatings can be applied to the substrate by any suitable means such as electroplating and/or integrated circuit deposition techniques.

Figure 9:
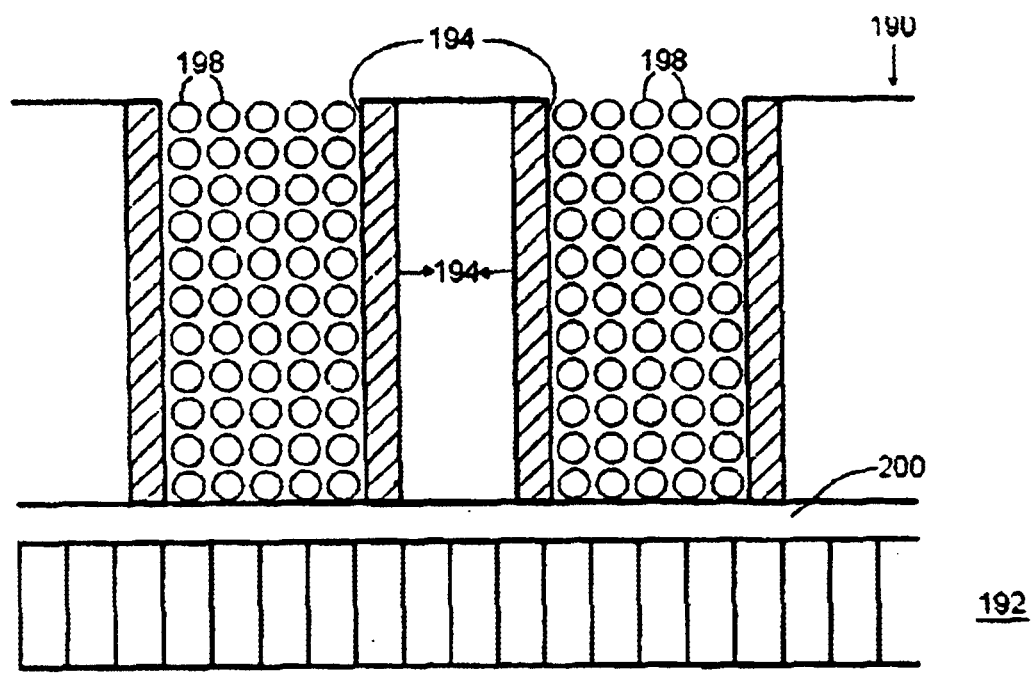
FIG. 9 is an enlarged sectional view of a microchannel phosphor screen according to an embodiment of the present invention integrated with a standard photomultiplier.

The X-ray detecting microchannel substrates of the present invention may also be bonded to the faceplate of commercially available photomultipliers; either directly or through relay and/or light collection optics such as microlenses, relay lenses or fiberoptic bundles; to provide X-ray detection capabilities to conventional photomultipliers. Such an arrangement is shown in FIG. 9 which shows a portion of an X-ray detector substrate 190 bonded to the faceplate of a conventional photomultiplier 192. Detector substrate 190 includes a multiplicity of microchannels 194 having optically reflective metal coatings 196 which are filled with the phosphors or phosphors 198. An optically transparent thin window 200 may optionally be located beneath microchannel substrate 190.

Figure 10:
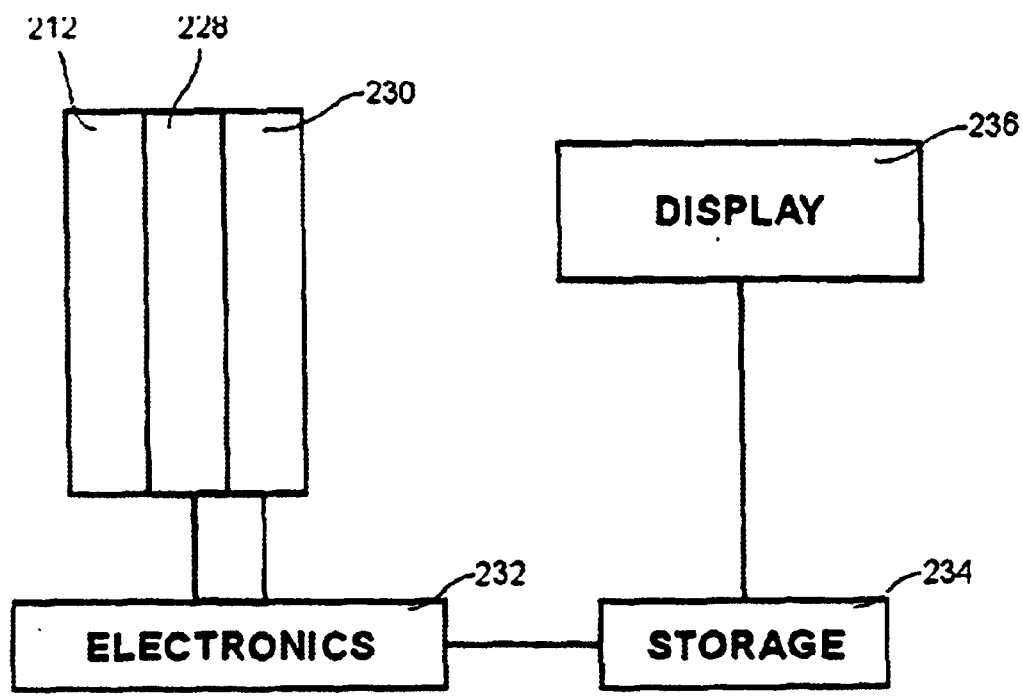
FIG. 10 is a schematic illustration of an embodiment of the microchannel phosphor screen of the present invention used in conjunction with a photomultiplier, electronic light detector storage and display.

FIG. 10 illustrates schematically microchannel plate 212 within the microchannels as integrated into a digital X-ray imaging system 226. In imaging system 226 microchannel plate 212 is bonded to a photomultiplier 228 for amplifying the light output of phosphors 220 contained within microchannels 210. Photomultiplier 228 includes, for example, a faceplate to which microchannel plate 212 may be bonded and is advantageously of the microchannel type "image intensifier" which includes microchannels including electron emissive materials. The electron emissive materials are acted upon by the light emitted by microchannel plate and means to multiply the emitted electrons many times and direct them to a phosphor screen which reconverts the multiplied electrons to light. A pixel based digital light sensor 230, such as a CCD or CMOS panel may be bonded to the rearplate of photomultiplier 228. The output of light sensor 230 is applied to control electronics 232 and can be stored in digital form in storage 234 and displayed for the operator by means of standard display 236. Control electronics 232, storage system 234 and display 236 can be implemented simply by the use of standard personal computers, with suitable programming, such as desktop and laptop computers.

Figure 11:
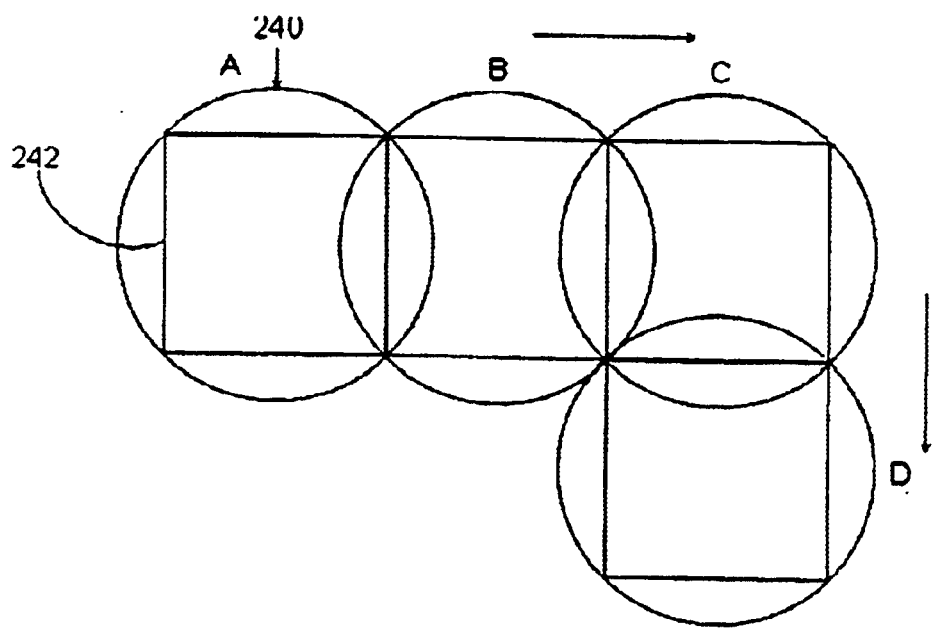
FIG. 11 illustrates the indexing of the microchannel phosphor screen according to an embodiment of the present invention so that it can form images larger than that of the plate itself.

The diameter or the linear dimension of the microchannel plates can be from less than an inch to 4 inches or more. However this does not limit the size of the images that can be obtained as a series of images taken at different times and positions can be digitally stored and "sewn" together on the display. This is shown in FIG. 11 in which a single microchannel phosphor screen 240 constructed in accordance with the present invention and having an imaging area 242 which is "indexed" or displaced in space from a first position A through subsequent positions B, C, D . . . (the displacement can be either along a curve or in a straight line). At each position an image is obtained and stored for subsequent assembly into an image covering a much larger physical area than the size of microchannel phosphor screen 240. The fact that multiple exposures are taken is not a concern since the use of a photomultiplier means that each individual X-ray exposure can be greatly reduced.

Figure 12:
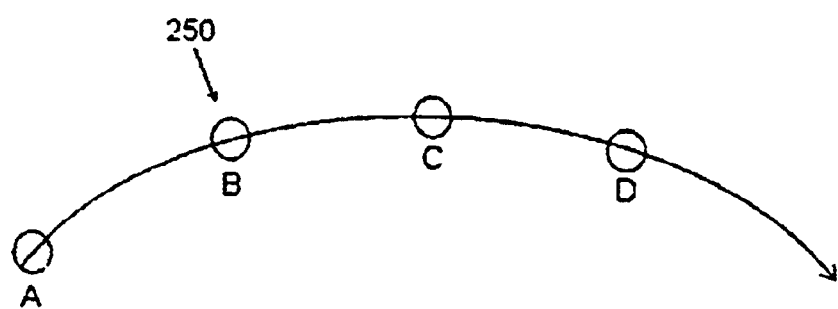
FIG. 12 illustrates the use of the microchannel phosphor screen according to an embodiment of the present invention for CAT and 3-D imaging applications.
Figure 12:
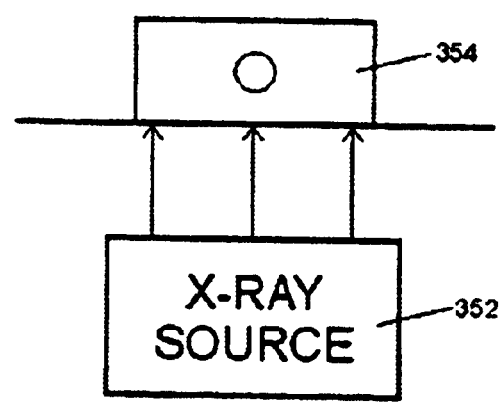

In addition to the imaging of larger sized areas, the displacement of the microchannel phosphor screen of the present invention and the storage of images taken at various positions can also be used to provide CAT and 3-D tomography as shown in FIG. 12 which illustrates an imaging system 250 which includes the X-ray source 252 for 3-D imaging of a target 254. A single microchannel phosphor screen 256 can be rotated to a series of positions A, B, C, D etc. At each position, an image "slice" is obtained and stored for subsequent assembly into a tomographic image. Again, the fact that multiple exposures are taken is not a concern since the use of a photomultiplier means that each individual X-ray exposure can be greatly reduced. Furthermore, instead of a single microchannel phosphor screen 256 which is moved through space, multiple microchannel phosphor screens at fixed positions could be used.

The present invention has been described with respect to exemplery embodiments. However, as those skilled in the art will recognize, modifications and variations in the specific details which have been described and illustrated may be resorted to without departing from the spirit and scope of the invention as defined in the appended claims.

Construction of Large size Microchannel Imaging Screens

Figure 13A:
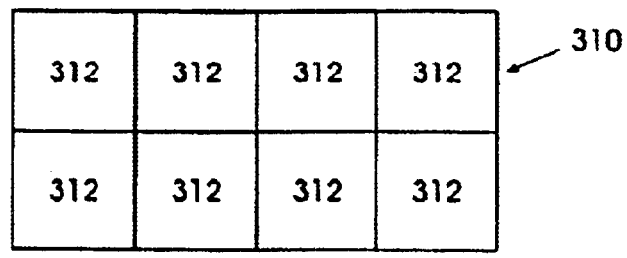
FIG. 13a is a plan view a first tiling arrangement for a plurality of microchannel plates forming an imaging screen and FIG. 13b is a sectional view of this tiling arrangement.
Figure 13B:
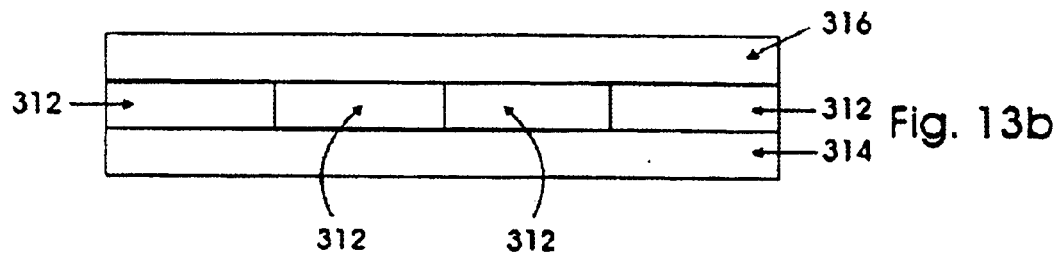

FIG. 13a illustrates in plan view a first tiling arrangement for a plurality of microchannel plates used to form an imaging screen 310 and FIG. 13b is a sectional view of this tiling arrangement. In FIG. 13a imaging screen 310 is formed from a plurality of individual microchannel plates 312 disposed on a planar base substrate 314. Microchannel plates 312 can be rectangular, square or hexagonal in configuration and can be formed by cleaving round microchannel plates into the appropriate shape and such that the microchannels of the individual plates extend to the edges of plates 312 so that phosphor filled microchannel will be present across the entire surface of imaging screen 310. microchannel plates 312 are preferably releasably mounted to substrate 314 by a suitable releasable adhesive so as to permit a damaged individual plate 312 to be removed and replaced on substrate 314.

Optionally disposed above microchannel plates 312 is an electronic light detection device 316 such as a Charged Coupled Device (CCD) or a CMOS silicon device. This arrangement is suitable for use in applications where the microchannel plates are to be read from the backside. In this case substrate 314 forms the upper surface of imaging screen 310 and should be constructed from X-ray transparent materials. Many plastics are suitable for use as substrate material and as such can provide a certain degree of flexibility to screen 10 as well as forming a protective cover for the array of microchannel plates 312. If the microchannel plates are to be read out from the top, substrate 314 can also be constructed from X-ray absorbing material.

Figure 14B:
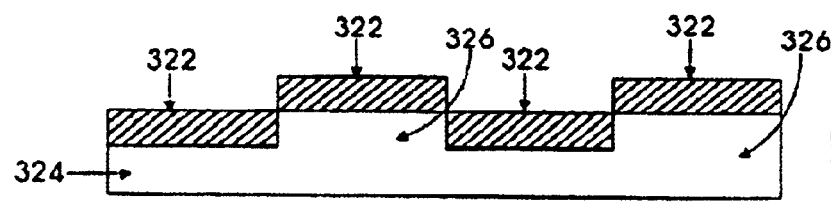
FIG. 14a is a plan view a second tiling arrangement for a plurality of microchannel plates forming an imaging screen and FIG. 14b is a sectional view of this tiling arrangement.
Figure 14A:
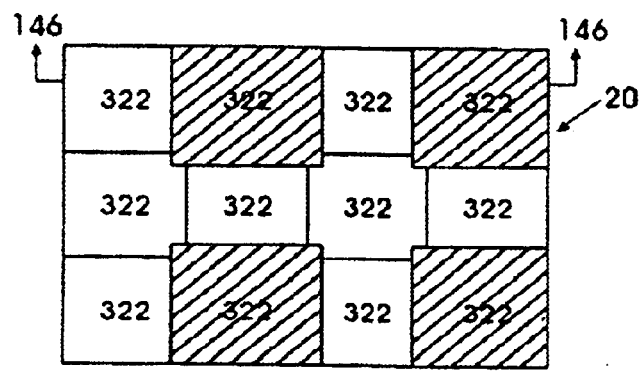

FIG. 14a illustrates in plan view a second tiling arrangement for a plurality of microchannel plates used to form an imaging screen 320 and FIG. 2b is a sectional view of the second tiling arrangement. In FIG. 14a imaging screen 320 is formed from a plurality of individual microchannel plates 322 disposed on a stepped substrate 324 (which is best seen in FIG. 14b). Substrate 324 includes a series of upstanding "mesas" 326 which elevate certain of microchannel plates 322 above the adjoining microchannel plates. The height of mesas 326 is slightly greater than the thickness of microchannel plates 322 this permits plates to be arranged so that the peripheral edges of the individual plates 322 overlap. The overlapping of the edges of microchannel plates Microchannel plates 322a reduces any artifacts in the images since it reduces the effect of the edges of the individual plates.

Plates 322 can be rectangular, square or hexagonal in configuration and can again be formed by cleaving round microchannel plates into the appropriate shape and are preferably mounted to substrate 324 by a suitable releasable adhesive so as to permit a damaged individual plate 322 to be removed and replaced. The arrangement of FIG. 14 is particularly suitable for use in applications where the microchannel plates are to be read from the front side. Many plastics are suitable for use as substrate material and as such can provide a certain degree of flexibility to screen 320. If the microchannel plates are to be read out from the front side, substrate 324 can also be constructed from X-ray absorbing material. In addition to the two level arrangement shown in FIG. 14, a three or more level mounting arrangement for the microchannel plates can also be used.

Storage Phosphor Microchannel Imaging Screens

Figure 15:
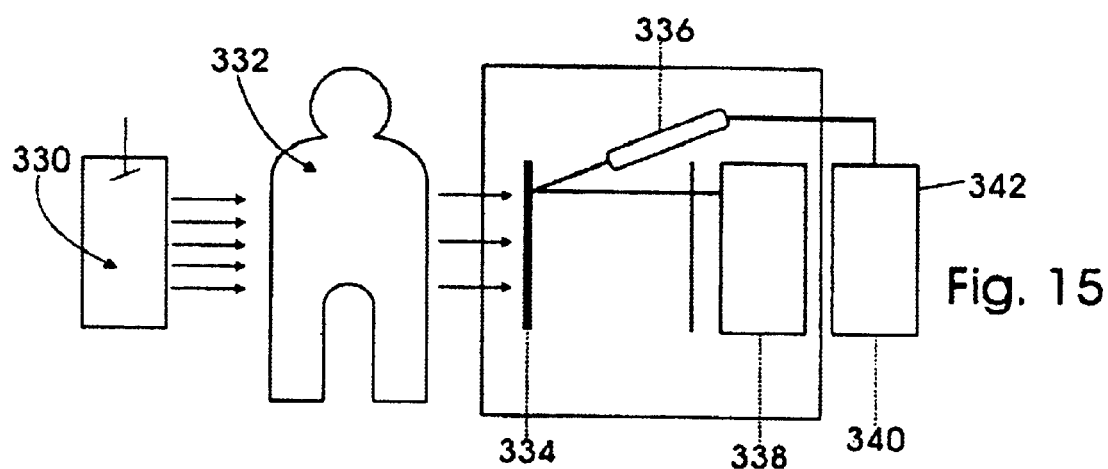
FIG. 15 illustrates schematically the operation of an X-ray imaging apparatus using a storage phosphor imaging screen.

FIG. 15 depicts schematically the operation of an X-ray imaging apparatus using a storage phosphor imaging screen in which an X-ray source 330 is used to irradiate a patient 332. The x-ray photons forming the image of patient 332 are absorbed by an storage phosphor imaging screen 334 which will store a dose proportional amount of energy corresponding to a latent image for an indefinite period of time. At a later time and perhaps at a different location, a focused Helium-Neon (He—Ne) laser 336 is raster scanned across the back of storage phosphor imaging screen 334 to read out the latent image. The red light of He—Ne laser 36 stimulates recombination resulting in photostimulated luminescence whose intensity is proportional to the X-ray dose. For each spot of imaging screen 34 the intensity of the photostimulated luminescence is measured by a Photomultiplier tube 338 and stored in a control computer 340. The image can be visualized by a monitor screen 342 or a hard copy output. Thermal means can also be used to read out the image by thermally stimulated luminescence.

Figure 16:
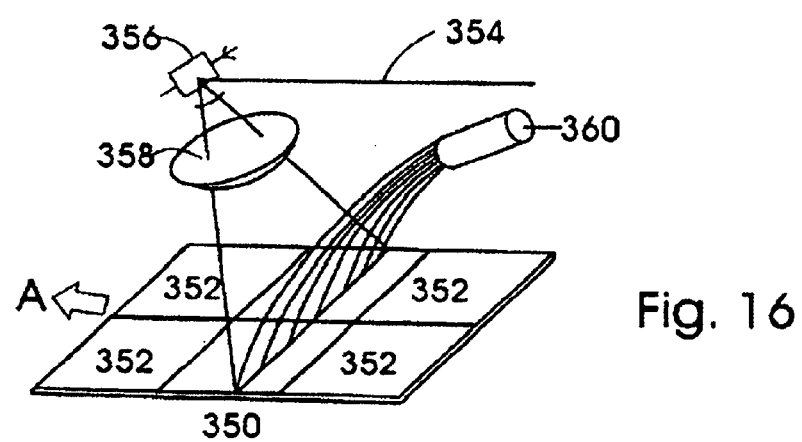
FIG. 16 illustrates, in perspective view, apparatus for reading the stored images on a storage phosphor imaging screen from the front side.

FIG. 15 illustrates the imaging screen being read out from the back (i.e. the side of the screen which did not face the X-rays), however as storage phosphor imaging screens store the image and do not have to be read out in real time, such screens can be removed from the imaging device and read out from the front side (i.e. the side of the screen facing the X-rays). FIG. 16 illustrates the apparatus for front side reading of the stored images on a storage phosphor imaging screen 350 constructed from a plurality of tiled microchannel plates 352a . . . 352e. Microchannel plates 352 are constructed in accordance with the principles set forth, and include a multiplicity of storage phosphors particles disposed in each microchannel. In FIG. 4 a laser beam 354 from a He—Ne laser impinges on a moving scanning mirror 356 and is focused by a lens 358 onto the surface of imaging screen 350. Laser beam 354 will cause photostimulated luminescence of the storage phosphor in the microchannel plates 352 which is measured by a photomultiplier tube 360 to form the image.

The standard storage phosphors, such as barium flourobromide (BaFBr:Eu$^{2+}$) doped with europium 2+, can readily be obtained in sizes sufficient to be disposed in the 5–40 micron diameter microchannels of microchannel plates 352. When, as shown in FIG. 4 a microchannel plate is read out from the front side, rather than from the back side, a number of design parameters of the microchannel plate are eased. The plate can be thicker, and thus easier to handle as only the phosphors in the upper portion of the plate are read out to form the image. In plates that are read from the back, thick plates mean relatively long microchannels which, because of the many internal reflections of the light that occur, can adversely affect light output with backside readout. The fact that only the phosphors in the upper portion of the microchannels are read also means that the microchannel need not be filled all the way down and the lower potion of the filled with non light emitting material. Furthermore, in a front read microchannel plate, the microchannels need also not be uniformly plated with a highly reflective coating all the way down the microchannels. Also, the microchannel plate could be fabricated out of X-ray transparent materials such as plastics. Due to the absence of any CCD or CMOS detector circuitry behind the plate, it is no longer necessary to prevent transmission of X-ray from the front face to the back face through the walls of the microchannel plate.

The present invention has been described with respect to exemplary embodiments. However, as those skilled in the art will recognize, modifications and variations in the specific details which have been described and illustrated may be resorted to without departing from the spirit and scope of the invention as defined in the appended claims.

What is claimed is:

1. A high resolution radiation imaging storage phosphor screen, comprising:
   a) a substrate having a planar surface;
   b) a multiplicity of microchannels extending into the surface of the substrate, each of said microchannels having a diameter of less than 40 microns,
   c) a multiplicity of storage phosphors disposed in each of said microchannels.

2. The phosphor screen as claimed in claim 1 wherein the phosphors have diameters of from about 40 to 75% of the diameter of the microchannels.

3. The phosphor screen as claimed in claim 1 further including a reflective coating disposed along the walls of the microchannels.

4. The phosphor screen as claimed in claim 3 wherein said reflective coating has a reflectivity of at least 85%.

5. The phosphor screen as claimed in claim 1, wherein the microchannels have a wall thickness of 1–12 microns.

6. The phosphor screen as claimed in claim 1, wherein the reflective coating has a thickness of less than about 50 nanometers.

7. The phosphor screen as claimed in claim 1, wherein the plate has a thickness of from about 50 microns to about 2000 microns.

8. The phosphor screen as claimed in claim 1 wherein the storage phosphor comprises BaFBr:Eu$^{2+}$.

9. The phosphor screen as claimed in claim 1 further including refractive matching material disposed in the microchannels together with the phosphors.

10. The phosphor screen as claimed in claim 1 wherein the radiation that is to be imaged comprises X-rays.

11. A high resolution radiation imaging phosphor screen, comprising:
   a) a base substrate having a mounting surface;
   b) a plurality of microchannel plates releasably secured to the mounting surface of the base substrate, each of said microchannel plates having a multiplicity of microchannels having a diameter of less than 40 microns, and
   c) a multiplicity of phosphors disposed in each of said microchannels.

12. The imaging screen as claimed in claim 11 wherein the base substrate includes series of upstanding mesas, selected ones of said plurality of microchannel plates being releasably secured to said mesas others of said plurality of microchannel plates being releasably secured to the portions of the base substrate between said mesas.

13. The imaging screen as claimed in claim 12 wherein the edges of the microchannel plates that are releasably secured to said mesas overlap the edges of the microchannel plates releasably secured to the portion of the base substrate between said mesas.

14. The imaging screen as claimed in claim 11 wherein the phosphors disposed in each of said microchannels comprise storage phosphors.

15. The imaging screen as claimed in claim 11 wherein the storage phosphors disposed in each of said microchannels comprise BaFBr:Eu.sup.2+.

16. The imaging screen as claimed in claim 11, wherein the microchannel plates have a thickness of from about 50 microns to about 4000 microns.

* * * * *